Jan. 4, 1955    M. VAN VALKENBURGH ET AL    2,698,509
BALANCE SPRING FOR CLOCKWORK MECHANISMS
Filed Nov. 23, 1951

Inventors
MERRITT VAN VALKENBURGH
JAMES L. PRITCHARD
By Lindsey and Prutzman
Attorneys

United States Patent Office 2,698,509
Patented Jan. 4, 1955

2,698,509

BALANCE SPRING FOR CLOCKWORK MECHANISMS

Merritt Van Valkenburgh, Upper Nyack, N. Y., and James L. Pritchard, Hartford, Conn., assignors to M. H. Rhodes Incorporated, Hartford, Conn., a corporation of Delaware Application November 23, 1951, Serial No. 257,818

2 Claims. (Cl. 58—114)

This invention relates to the control mechanism for time movements and more particularly to improvements in the balance spring therefor.

It is the general aim of the invention to provide an escapement or cnotrol mechanism for time movements which is sturdy and durable so as to withstand high acceleration, vibration, and shock and which will operate accurately under adverse conditions of atmospheric pressure and temperature, high or low.

A more specific object of the invention is to provide a balance spring which will enhance the foregoing operating characteristics of the balance, the spring to be of a type which may be easily and economically fabricated and arranged and which will require no attention after having been installed and which is readily adjustable accurately to determine the period of oscillation of the balance wheel for optimum operation of the movement or clockwork.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
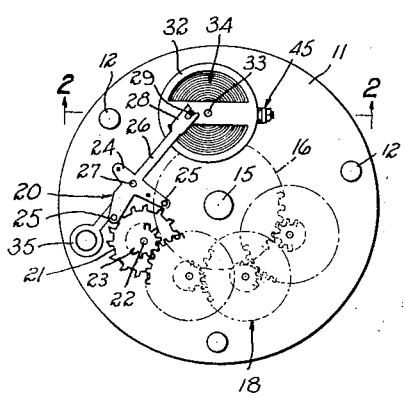
Fig. 1 is an elevational view of an exemplary clockworks having a control mechanism which includes the balance of the present invention.

Referring to the drawings in greater detail, Fig. 1 illustrates a clockwork mechanism or time movement found, for example, in the construction of an interval timer. In accordance with conventional practice, the clockwork mechanism is supported by front and rear frame plates 10 and 11, respectively, which are held in spaced parallel relation by means of pillars 12. In Fig. 1 in order to illustrate the details of the clockwork mechanism, the front plate 10 has been removed.

The driving, the transmitting and indicating mechanisms included in the movement are conventional and well-known and need not be described in detail herein. However, for a complete understanding of the control mechanism, the driving mechanism and the transfer mechanism will be referred to briefly herein. The driving mechanism may comprise, for example, a main spring (not shown) which is wound about and secured to an arbor 15. The stored energy of the main spring is utilized to turn the arbor and a toothed wheel or gear 16 fixed thereto.

The transmitting mechanism comprises a gear train or time train indicated generally by the numeral 18 which is driven by the gear 16 and which engages the control mechanism indicated generally by reference numeral 20.

It is the function of the control mechanism to impede the operation or movements of the transmitting mechanism so that the driving energy stored by the main spring will be dissipated at the proper rate for timed operation of the movement. The control mechanism 20 includes a conventional escape wheel 21 mounted upon a staff 22 journaled by the frame plates and which also carries a pinion 23 engaged by the time train or transmitting mechanism 18. In the present illustrative example, a detached lever escapement is utilized in the control mechanism for cooperation with the escape wheel and the same includes a pallet 24 and pallet pins 25 engageable with the teeth of the escape wheel. The pallet is formed integrally with a lever 26 which is pivotally mounted between the frame plates on staff 27. In accordance with the standard practice, one end of the lever defines a fork 28 and the other end of the lever is formed with a counterbalance ring 35. The lever is disposed so that the work will engage a pin 29 carried by crosspiece 30 in balance wheel 32. The balance wheel is fixed to a balance staff disposed between the frame plates for oscillation as determined by the moment of inertia of the balance wheel and the restoring torque per degree of displacement of a balance spring 34.

The control mechanism as thus far described functions in the well-known manner, that is, the pallet is arranged for oscillation adjacent the escape wheel and the pallet pins are arranged for alternate engagement with the teeth of the escape wheel so that one tooth of the escape wheel is permitted to escape the pallet as the same moves in either direction. The escape wheel provides an impulse to the pallet as each tooth escapes, said impulses being effective to oscillate the lever and fork whereby the balance wheel is oscillated. The balance spring controls the frequency of oscillation by returning the balance wheel from rotated positions. Engagement between the pallet pins and the teeth of the escape wheel retards or impedes the movement of the transfer mechanism or time train so that the energy stored by the main spring will not be dissipated in other than in timed operation as determined by the frequency of oscillation of the balance wheel.

It is conventional in the construction of balance mechanism to include a balance spring which is coiled in one plane with one end of the spring secured to the balance wheel or to a hub or collet therefor and with the other end of the spring secured in some manner against movement. Such conventional springs are of rectilinear cross-sectional configuration, as for example, the flat spring type. The conventional or common spring is subject to many disadvantages. For example, the common spring and the arrangement thereof relative to the balance wheel, etc. will not withstand jarring, rough usage, high rates of vibration and/or acceleration.

Figure 2:
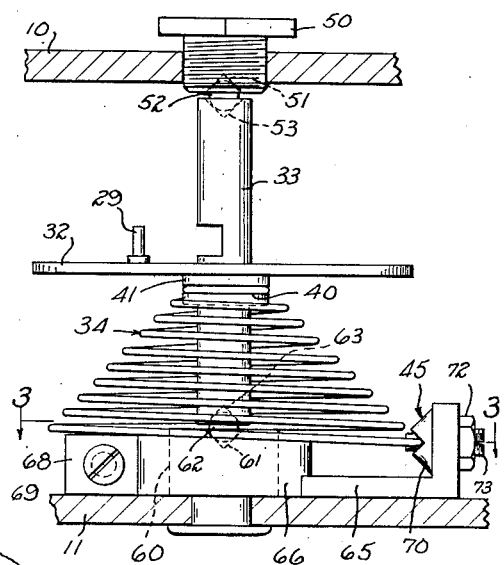
Fig. 2 is cross-sectional view of the balance taken substantially as indicated by line 2—2 on Fig. 1.
Figure 3:
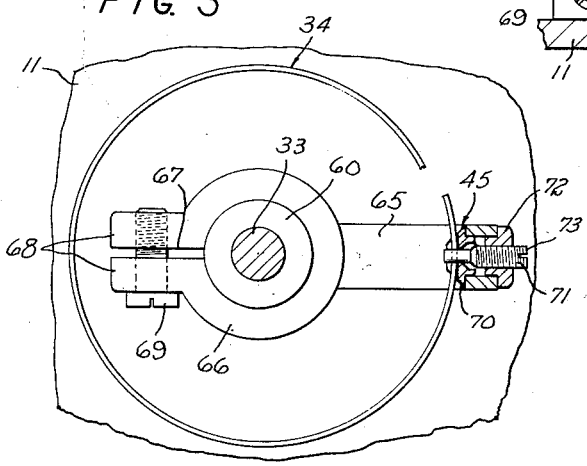
Fig. 3 is a horizontal sectional view of the balance taken substantially as indicated by line 3—3 in Fig. 2.

In accordance with the present invention, the balance spring 34 comprises a volute coiled spring of piano wire or the like having a circular cross section. In the embodiment shown in the drawings, the smaller coil is disposed within an annular groove 40 provided in the periphery of the collet or hub 41 for the balance wheel 32. The end of the spring adjacent the smallest coil may be secured in the collet as by inserting said end within a radial channel or aperture (not shown) provided in the collet and communicating with the groove 40. The end of the spring adjacent the largest coil is adjustably secured against movement in response to movements of the balance wheel by clamp means 45. As will be seen in Fig. 2, the spring surrounds the balance staff 33 and extends between the balance wheel 32 to the clamp means adjacent the back plate 11.

The aforedescribed balance spring has distinct advantages over the common type balance spring. For example, the circular cross-sectional configuration provides greater stability to resist distortion in any direction due to vibration, acceleration, and shock than is to be found in a common spring having a rectangular cross section of equal area because the same resistance is offered to bending forces applied from any direction. The volute coiled configuration lends a distinct advantage to the construction in that the spring can be compressed or expanded or can be deflected towards the sides without the coils becoming snarled or restricted in their movements. Therefore, during operation, the coils of this spring cannot under any combination of forces bind together or touch each other to effect a shortening of the effective length of the spring, and consequently the timing accuracy of the spring is unaffected by such contortions as may be caused by shock or by acceleration.

In addition, a heavy spring calculated to withstand hard usage can be utilized in the construction since the colute configuration provides for greater spring length in the available space to compensate for increased spring thickness. Thus a relatively heavy volute spring can be substituted for a relatively light common hairspring and will have the same restoring torque of the common spring due to its increased length. A further advantage of the present invention is the economy of manufacture and assembly as compared to the common spring. A still further advantage resides in the fact that the balance spring of the present invention may be used with any of the various types of escapement mechanisms known and commonly used today.

As previously mentioned, the balance staff 33 is transversely disposed between the frame plates. The means rotatably mounting the staff relative to said frame plates includes an adjustable bearing block 50 threaded into the front plate 10 and provided with a centrally disposed conical bearing seat 51. A ball bearing 52 is partly disposed within said seat and is also seated within a conical seat 53 in the arm of the balance staff. The rear end of the staff is similarly supported by bearing block 60 secured in the rear frame plate 11 and provided with a conical bearing seat 61 which accommodates ball bearing 62 seated therein and within the conical seat 63 in the end of the balance staff.

The clamp means 45 includes a notched or grooved member 70 arranged to receive the large coil end of the balance spring within its notch or groove, said end of the spring being retained within the groove by means of an apertured plug 71 movable transversely of the notch and which receives the end portion of the wire. The plug is provided with threads to engage the threaded bore of a nut 72 and the plug has a tool receiving tip 73 which may be engaged by a screwdriver to axially position the plug relative to the nut 72 and relative to the grooved member 70 whereby to clamp the end portion of the large coil within the notch or groove provided in the member 70.

Said clamp means is mounted upon a radial arm 65 carried by a sleeve 66 which surrounds the rear bearing block 60 adjacent the frame plate 11. The sleeve is slit at 67 and provided with flanges 68 to receive the clamping screw 69. By loosening the screw 69 in the flanges 68, the sleeve may be rotated relative to the bearing block whereby the arm 65 and clamp means can be rotated to adjusted positions relative to the balance spring. The sleeve and the clamp means are secured in adjusted positions by tightening the screw 69 within the flanges 68 to thereby prevent relative rotation between the sleeve and bearing block.

By adjusting the rotated position of the sleeve and by clamping the end portion of the spring adjacent the largest coil in the clamping means 45 in the adjusted positions of the sleeve, one is enabled to vary the effective length of the volute balance spring 34. Adjusting or selecting the effective length of the balance spring has the effect of predetermining the frequency of the balance and thus "timing" the balance. Accordingly, by shifting the sleeve relative to the balance staff and by shifting the grip of the clamping means upon the large coil end of the spring, one can accurately control the timed operation of the clockworks.

Figure 4:
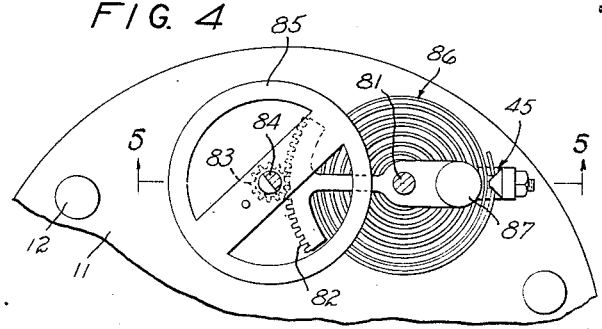
Fig. 4 is a fragmentary elevational view similar to Fig. 1 showing a modified balance construction incorporated in the clockworks.
Figure 5:
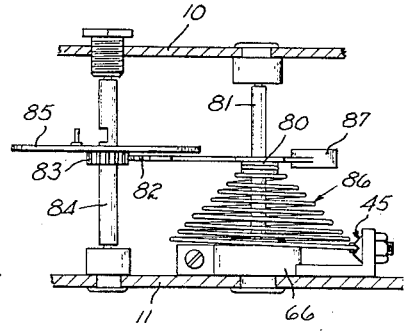
Fig. 5 is a cross-sectional view taken substantially as indicated by the line 5—5 in Fig. 4.

Figs. 4 and 5 illustrate a modification of the balance mechanism described above in that the balance spring is not connected directly to the balance wheel. In the modified embodiment, the balance spring is connected to a hub or collet 80 fixed to a staff 81 supported between the frame plates, said staff carrying a segmental gear 82 which engages a pinion 83 fixed to a balance staff supported between frame plates in the manner described in connection with the first embodiment of the invention. In the modification, the balance staff 84 carries a balance wheel 85 which is similar in all respects to the previously described balance wheel 32. In the modified construction the balance spring 86 is considerably heavier than balance springs ordinarily utilized in clockwork mechanisms and is heavier than the balance spring 34 described above due to the ratio or relation between the segment and pinion. For example, assume the ratio between pinion and segment to be 6 to 1, then if the balance wheel is to be rotated 180° the segment need be rotated only 30°. In the modification the spring must have 6 times the restoring torque to accomplish the work in 30° that would be accomplished in 180° if the spring were mounted directly upon the balance staff and secured to the balance wheel. Therefore the spring used in the modification will be much heavier in order to supply the necessary restoring torque and will thus withstand the shocks of hard usage and acceleration better than any common hairspring having similar torque characteristics.

The segmental gear is balanced for rotation by means of a weight 87 disposed oppositely of the teeth formed on the gear so that the spring 86 will oscillate with the proper amplitude in both directions. The large coil end of the spring 86 is adjustably secured by the clamp means and adjustable sleeve members 45 and 66, respectively, which are similar in all respects to the clamp means and sleeve described in connection with the first embodiment.

The clamp means used in both embodiments of the invention permit accurate adjustment of the volute balance spring for the timing operation and the clamp means secures the large end of the spring in adjusted position. Therefore, the volute spring can be distorted in any manner due to shock, etc. without slippage occurring so that the time characteristics of the balance are unaffected.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. A balance for a time movement of the type having a gear train driving an escape wheel and having an oscilltaable escapement engaged by the escape wheel, said balance comprising a balance staff, a balance wheel fixed to said staff, means on said balance wheel engageable by said escapement for movement therewith, a balance spring formed of wire having a circular cross-section and being coiled in volute configuration, means securing one end of said spring against movement, and means interconnecting the other end of said spring and said balance wheel.

2. A balance for a time movement of the type having a gear train driving an escape wheel and having an oscillatory escapement engaged by the escape wheel, said balance comprising a balance staff, a balance wheel fixed to said staff, means on said balance wheel engageable by said escapement for movement therewith, a pinion fixed to said staff, a second staff parallel to the balance staff, a gear meshing with said pinion and having a hub mounted on said second staff, a volute balance spring formed of wire having a circular cross-section surrounding said second staff in spaced relation thereto, means securing one end of said spring against movement, and means securing the other end of said spring to said hub for movement therewith.

References Cited in the file of this patent

UNITED STATES PATENTS

| | | |
|---|---|---|
| 65,116 | Ramsey | May 28, 1867 |
| 359,390 | Hunziker | May 15, 1887 |
| 552,715 | Lugrin | Jan. 7, 1896 |
| 867,015 | Coullery | Sept. 24, 1907 |
| 1,202,047 | French | Oct. 24, 1916 |
| 2,209,172 | Putnam | July 23, 1940 |
| 2,584,786 | Burghoff | Feb. 5, 1952 |

FOREIGN PATENTS

| | | |
|---|---|---|
| 9,120 | Great Britain | Oct. 14, 1841 |